United States Patent
Shimada (10) Patent No.: US 10,245,872 B2
(45) Date of Patent: Apr. 2, 2019

(54) PRINTING AMOUNT MANAGEMENT APPARATUS AND METHOD

(71) Applicants: KABUSHIKI KAISHA TOSHIBA, Tokyo (JP); TOSHIBA TEC KABUSHIKI KAISHA, Tokyo (JP)

(72) Inventor: Keisuke Shimada, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/720,674

(22) Filed: Sep. 29, 2017

(65) Prior Publication Data

US 2018/0257418 A1  Sep. 13, 2018

(30) Foreign Application Priority Data

Mar. 10, 2017  (JP) ................. 2017-046186

(51) Int. Cl.
- *G06F 3/12* (2006.01)
- *G06K 15/00* (2006.01)
- *B41M 7/00* (2006.01)
- *G03G 15/00* (2006.01)
- *G06K 15/02* (2006.01)

(Continued)

(52) U.S. Cl.
CPC .......... *B41M 7/0009* (2013.01); *G03G 15/50* (2013.01); *G03G 15/5091* (2013.01); *G03G 15/6585* (2013.01); *G03G 21/00* (2013.01); *G06K 15/1867* (2013.01); *G06K 15/4065* (2013.01); *G03G 15/5075* (2013.01); *H04N 1/00244* (2013.01); *H04N 2201/0094* (2013.01)

(58) Field of Classification Search
None
See application file for complete search history.

(56) References Cited

U.S. PATENT DOCUMENTS 9,342,029 B1  5/2016  Tabata
2007/0273915 A1  11/2007  Nakagawa
(Continued)

FOREIGN PATENT DOCUMENTS

EP  3106315 A2  12/2016

OTHER PUBLICATIONS

Extended European Search Report dated May 14, 2018 in corresponding European Patent Application No. 18157620.8, 6 pages.

*Primary Examiner* — Dov Popovici
(74) *Attorney, Agent, or Firm* — Kim & Stewart LLP (57) ABSTRACT

A printing amount management apparatus according to an embodiment communicates with an image processing apparatus which prints an image on a sheet and a decoloring apparatus which decolors an image formed on the sheet with a decolorable toner. A storage unit stores, in correspondence with each of a plurality of user records, a printing amount that sets a maximum number of times of printing in the image processing apparatus in association with the corresponding user record. A processor receives, from the decoloring apparatus via the communication interface, a number of sheets decolored by the decoloring apparatus according to an operation of a user corresponding to one of the plurality of user record. The processor increases, based on the received number of decolored sheets, the printing amount stored in the storage unit in correspondence with the one of the plurality of user record.

5 Claims, 11 Drawing Sheets (51) Int. Cl.
*G03G 21/00* (2006.01)
*H04N 1/00* (2006.01)

(56) References Cited

U.S. PATENT DOCUMENTS

| | | |
|---|---|---|
| 2012/0327487 A1 | 12/2012 | Kamisuwa et al. |
| 2015/0022850 A1 | 1/2015 | Morizumi et al. |
| 2016/0185147 A1 | 6/2016 | Iguchi |

| USER ID | USER NAME | PASSWORD | DEPARTMENT NUMBER | DOMAIN NAME | ACCOUNT STATUS |
|---|---|---|---|---|---|
| 1 | aaa | ****** | 100 | abc.com | AVAILABLE |
| 2 | bbb | ****** | 100 | abc.com | UNAVAILABLE |
| 3 | ccc | ****** | 100 | abc.com | AVAILABLE |
| 4 | ddd | ****** | 200 | def.com | AVAILABLE |
| 5 | eee | ****** | 200 | def.com | AVAILABLE |
| 6 | fff | ****** | 300 | ghi.com | AVAILABLE |
| 7 | ggg | ****** | 300 | ghi.com | UNAVAILABLE |
| 8 | hhh | ****** | 300 | ghi.com | AVAILABLE |
| 9 | iii | ****** | 400 | jkl.com | AVAILABLE |
| ... | ... | ... | ... | ... | ... |

FIG. 4A

| PRINTING MODE | COUNT VALUE | | | |
|---|---|---|---|---|
| | FULL COLOR | TWO COLORS/ MONOCHROME COLOR | BLACK | TOTAL |
| COPYING | 1 | 2 | 3 | 6 |
| PRINTING | 1 | 2 | 3 | 6 |
| TOTAL | 2 | 4 | 6 | 12 |

FIG. 4B

| | COUNT VALUE |
|---|---|
| DECOLORING COUNT | 5 |

FIG. 4C

| | QUOTA VALUE | MAXIMUM VALUE |
|---|---|---|
| PRINTING | 11 | 20 |

PRINTING AMOUNT MANAGEMENT APPARATUS AND METHOD

CROSS-REFERENCE TO RELATED APPLICATION

This application is based upon and claims the benefit of priority from Japanese Patent Application No. 2017-046186, filed Mar. 10, 2017, the entire contents of which are incorporated herein by reference.

FIELD

Embodiments described herein relate generally to a printing amount management apparatus and method.

BACKGROUND

In the related art, a decolorable toner is decolored when heated at a temperature equal to or higher than a predetermined temperature. Accordingly, an image forming apparatus is capable of printing using the decolorable toner, and a decoloring apparatus is capable of decoloring an image printed with the decolorable toner. Since a decolored sheet can be reused for a new printing process, it is economical for a user and it is possible to reduce an environmental burden. In order to promote reuse of such a sheet, there is demand to give value to the user who reuses the sheet when using the image forming apparatus.

DETAILED DESCRIPTION

Embodiments provide a printing amount management apparatus that provides value to a user who reuses a sheet when using an image forming apparatus.

A printing amount management apparatus according to an embodiment communicates with an image processing apparatus which prints an image on a sheet and a decoloring apparatus which decolors an image formed on the sheet with a decolorable toner. A storage unit stores, in correspondence with each of a plurality of user records, a printing amount that sets a maximum number of times of printing in the image processing apparatus in association with the corresponding user record. A processor receives, from the decoloring apparatus via the communication interface, a number of sheets decolored by the decoloring apparatus according to an operation of a user corresponding to one of the plurality of user record. The processor increases, based on the received number of decolored sheets, the printing amount stored in the storage unit in correspondence with the one of the plurality of user record.

Hereinafter, a printing amount management apparatus and a related method according to an embodiment will be described with reference to drawings.

Figure 1:
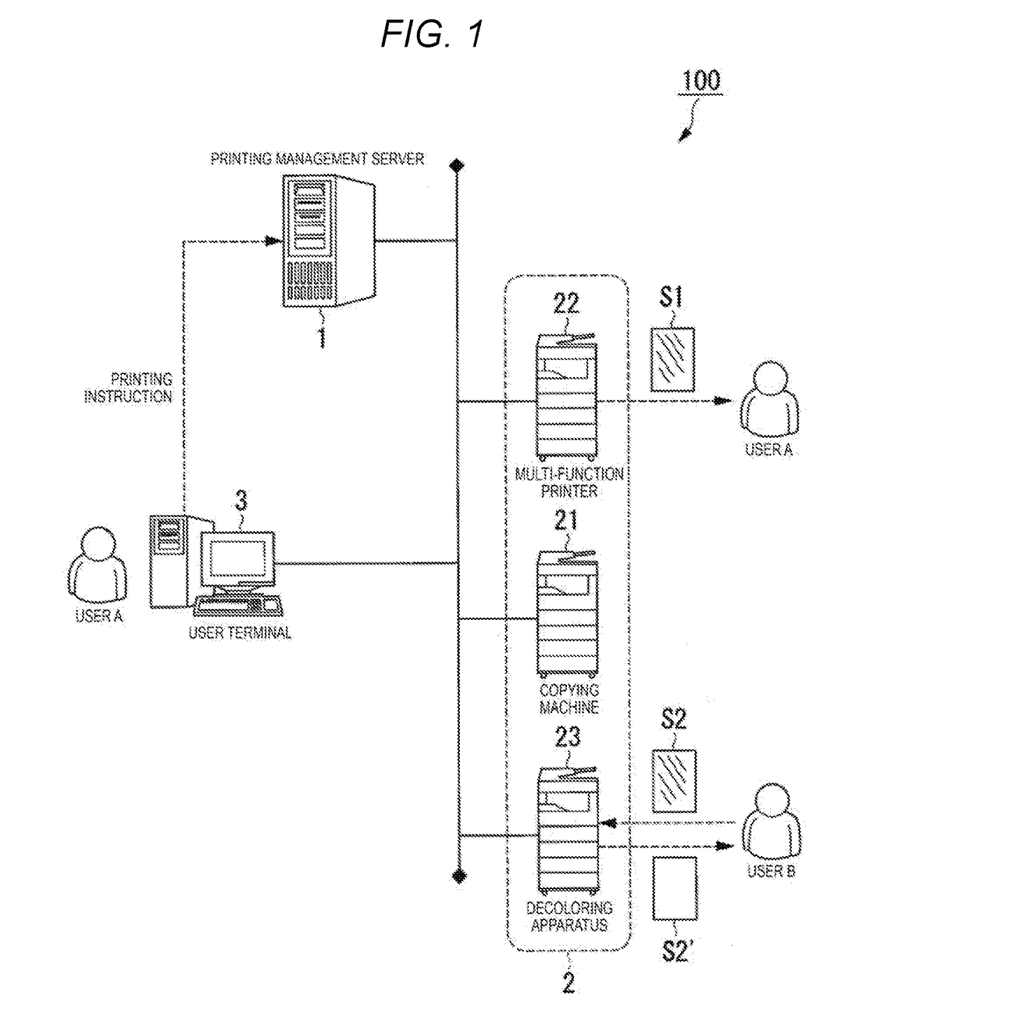
FIG. 1 is a diagram illustrating an example configuration of a printing system according to an embodiment.

FIG. 1 is a diagram illustrating an example configuration of a printing system 100 according to an embodiment. The printing system 100 includes a printing management server 1, image processing equipment 2 (which is a management target), and a user terminal 3. The printing management server 1, the image processing equipment 2, and the user terminal 3 are configured to include communication functions and be able to communicate with each other. The printing management server 1 is a server which manages the usage amount of the image processing equipment 2 by a user. FIG. 1 illustrates a copying machine 21, a multi-function printer 22, and a decoloring apparatus 23 as an example of the image processing equipment 2. Although the printing management server 1 may manage any type of usage related to the image processing equipment 2, a usage fee of the copying machine 21, the multi-function printer 22, or the like is generally charged according to the number of sheets of paper on which printing or copying is performed. For this reason, it is assumed that the printing management server 1 of the embodiment manages the number of sheets printed or copied by each user using the copying machine 21 and the multi-function printer 22 as the usage amount.

The user terminal 3 is a terminal device used by a user to use the printing system 100. The user terminal 3 may be a Personal Computer (PC) or an information terminal such as a smartphone or a tablet. For example, the user can instruct execution of any process performed by the image processing equipment 2, such as printing, copying, and decoloring, by using the user terminal 3. For example, FIG. 1 illustrates a state in which a user A instructs the multi-function printer 22 to execute a printing process using the user terminal 3, and obtains a printed sheet S1 from the multi-function printer 22. In addition, for example, the user can perform adding or removing of the image processing equipment 2 as a management target, adding or removing of or a user, editing of user information or equipment information, and the like by accessing to the printing management server 1 using the user terminal 3.

The image processing equipment 2 does not necessarily need to be operated via the user terminal 3, and may instead be directly operated by the user. For example, FIG. 1 illustrates a state in which an execution instruction of a decoloring process is input to the decoloring apparatus 23 by direct operation of a user B. Sheet S2 in FIG. 1 represents a sheet which is a processing target of a decoloring process, and sheet S2' in FIG. 1 represents the sheet after the decoloring process. The user B causes the decoloring apparatus 23 to process the sheet S2 printed by a decolorable toner so that the user B can obtain the sheet S2' on which an image formed by the decolorable toner is decolored. In this way, the image processing equipment 2 can execute each process such as printing, copying, and decoloring directly or indirectly input by the user.

Meanwhile, the image processing equipment 2 notifies the printing management server 1 of a use state of an own apparatus by each user. Based on the use state of each user notified from each of the image processing equipment 2, the printing management server 1 manages the amount used of the image processing equipment 2 for each user.

Figure 2:
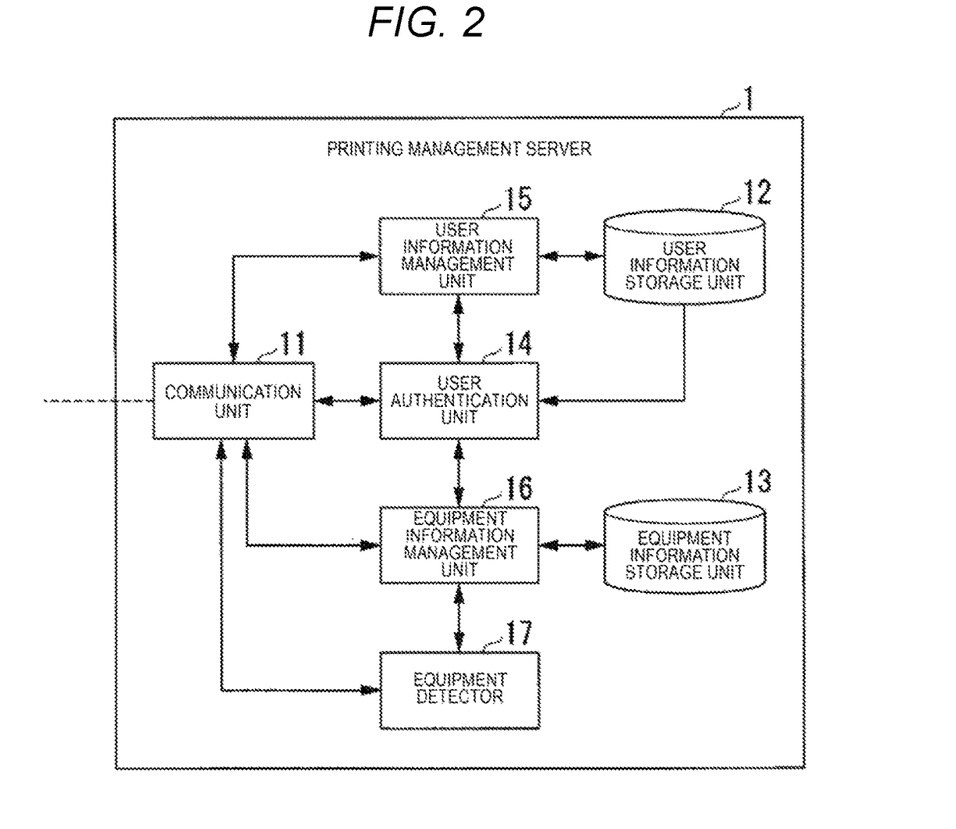
FIG. 2 is a block diagram illustrating an example functional configuration of a printing management server according to the embodiment.

FIG. 2 is a block diagram illustrating an example functional configuration of the printing management server 1 according to the embodiment. The printing management server 1 includes a Central Processing Unit (CPU), a memory, an auxiliary storage device, and the like connected by a bus, and executes a program. The printing management server 1 executes the program and is thereby configured to perform functions of a communication unit 11, a user information storage unit 12, an equipment information storage unit 13, a user authentication unit 14, a user information management unit 15, an equipment information management unit 16, and an equipment detector 17. All or a part of each of the functions of the printing management server 1 may be realized by using hardware such as a processor, an Application Specific Integrated Circuit (ASIC), a Programmable Logic Device (PLD), and a Field Programmable Gate Array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk embedded in a computer system. The program may be transmitted via a communication line.

The communication unit 11 includes a communication interface. The communication unit 11 is configured to be capable of communicating with each device included in the printing system 100 and the user terminal 3.

The user information storage unit 12 and the equipment information storage unit 13 include a storage device such as a magnetic hard disk device or a semiconductor storage device. The user information storage unit 12 stores user information and the equipment information storage unit 13 stores equipment information. The user information is information related to a user who uses the printing system 100. The user information includes authentication information and printing amount management information for each user. The authentication information is information necessary for a user to log in the printing system 100. For example, the authentication information is information indicating a user ID and a password for each user. The printing amount management information is information necessary for managing the amount used of each user. The equipment information is information related to various image processing equipment 2 included in the printing system 100.

The user authentication unit 14 performs a function of authenticating a user who accesses the printing management server 1. Specifically, based on authentication information for each user stored in the user information storage unit 12, the user authentication unit 14 performs an authentication process to a user who accesses a user management function and an equipment management function of the printing management server 1. The user authentication unit 14 manages a state of authentication of each user as either an authentication state or a non-authentication state. The user authentication unit 14 permits access to the user management function and the equipment management function only to a user who is in the authentication state.

The user information management unit 15 has a function for managing user information. Specifically, the user information management unit 15 provides a management interface for managing user information to a user, and has a function of registering and updating the user information according to an input of the user. In addition, based on information communication between the image processing equipment 2, the user information management unit 15 has a function of updating the user information.

The equipment information management unit 16 has a function for managing equipment information. Specifically, the equipment information management unit 16 provides a management interface for managing equipment information to a user, and has a function of registering and updating the equipment information according to an input of the user.

The equipment detector 17 has a function of detecting equipment (hereinafter, referred to as "registrable equipment") capable of being registered as a management target, i.e., the image processing equipment 2 of the printing system 100. In response to a request from the equipment information management unit 16, the equipment detector 17 tries to detect the registrable equipment and provides a detection result to the equipment information management unit 16.

Figure 3:
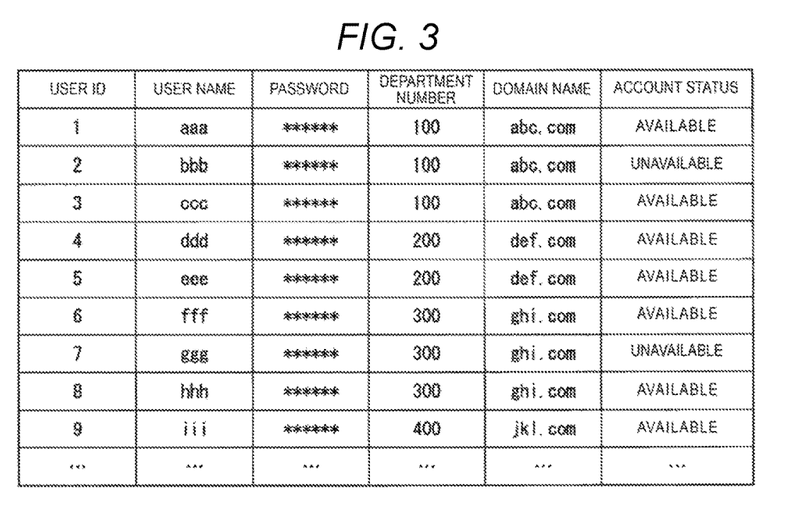
FIG. 3 illustrates an example of user information.

FIG. 3 illustrates an example of user information. For example, the user information is stored in the user information storage unit 12 as a user information table illustrated in FIG. 3. The user information table includes a user information record for each of a plurality of user IDs. The user information record includes the corresponding user ID, a user name, a password, a department number, a domain name, and an account status. The user ID is information for identifying a user of the printing system 100. The user name represents a name of a user corresponding to the user ID. The password represents a password for the user corresponding to the user ID to log in the printing system 100. The department number is an identification number of a department to which the user corresponding to the user ID belongs. The domain name represents a domain to which the user corresponding to the user ID belongs. The account status represents a status of an account of the user corresponding to the user ID. The account status of the user is either available or unavailable. The account status may be changed automatically based on a predetermined condition or may be changed manually by a system administrator.

Figure 4A:
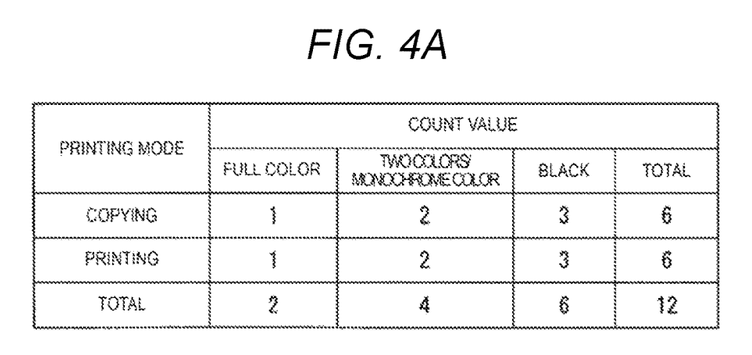
FIGS. 4A to 4C illustrate examples of printing amount management information.
Figure 4B:
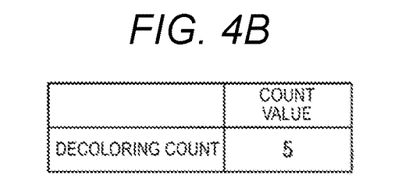
Figure 4C:
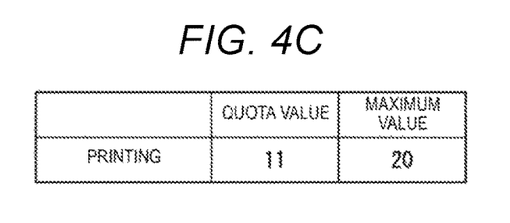

FIGS. 4A to 4C illustrating examples of printing amount management information. For example, the printing amount management information is stored in the user information storage unit 12 as a printing count table illustrated in FIG. 4A, a decoloring count table illustrated in FIG. 4B, and a printing amount table of FIG. 4C. The printing count table is a table which stores the number of times that each process of printing and copying are performed using the image processing equipment 2. FIG. 4A is an example of a printing count table in which the number of times that each process type of "printing" and "copying" is stored for each of various printing modes such as "full color", "two colors/monochrome color" and "black". In addition, as illustrated in the example in FIG. 4A, the printing count table may have rows and columns indicating a total number ("total" in FIG. 4A) for each row and column.

The decoloring count table is a table which stores the number of times that a decoloring process performed using the image processing equipment 2. The printing amount table is a table which stores a value of a printing amount and a maximum value (an example of the maximum amount) of the printing amount. The maximum value of the printing amount is an initial value of the printing amount. The printing amount is a value that is subtracted by 1 every time any one of printing or copying is executed. That is, the printing amount represents the remaining number of times a user can perform printing or copying. The printing amount management information described above is managed for each user of the printing system 100.

Figure 5:
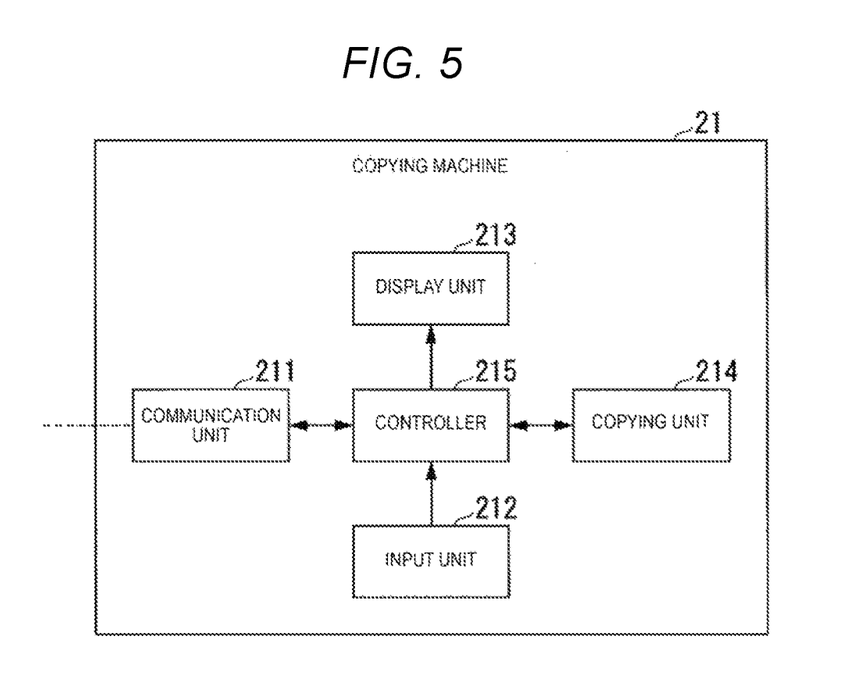
FIG. 5 is a block diagram illustrating an example functional configuration of an image processing equipment which is a management target.

FIG. 5 is a block diagram illustrating an example functional configuration of the image processing equipment 2. Here, as an example of the image processing equipment 2, a functional configuration of the copying machine 21 will be described. The copying machine 21 includes a CPU, a memory, an auxiliary storage device, and the like connected by a bus, and executes a program. The copying machine 21 executes the program and is thereby configured to perform functions of a communication unit 211, an input unit 212, a display unit 213, a copying unit 214, and a controller 215 by executing the program. All or a part of each of the functions of the copying machine 21 may be realized by using hardware such as ASIC, PLD, or FPGA. The program may be recorded on a computer-readable recording medium. The computer-readable recording medium is, for example, a portable medium such as a flexible disk, a magneto-optical disk, a ROM, or a CD-ROM, or a storage device such as a hard disk embedded in a computer system. The program may be transmitted via a communication line.

The communication unit 211 is configured to include a communication interface. The communication unit 211 is configured to be capable of communicating with each of devices included in the printing system 100 and the user terminal 3.

The input unit 212 includes one or more input devices such as a mouse, a keyboard, and a touch panel. The input unit 212 receives an input of a user to the copying machine 21. For example, in the copying machine 21, the input unit 212 receives an execution instruction of a copying process or an input of settings related to the copying process. The input unit 212 outputs input information from a user to the controller 215.

The display unit 213 includes a display device such as a Cathode Ray Tube (CRT) display, a liquid crystal display, an organic Electro-Luminescence (EL) display, and a touch panel. The display unit 213 displays the information output from the controller 215. For example, in the copying machine 21, the display unit 213 displays various types of information related to a copying process such as various menu screens, and an execution result of the copying process.

The copying unit 214 includes various functional units realizing the copying process. For example, the copying unit 214 includes functional units such as a reading unit which reads an original source sheet, and an image forming unit including a charging unit, an exposure unit, and a transfer unit which form an image on a copy destination sheet based on the read original source sheet. The copying unit 214 executes the copying process by control of the controller 215.

Based on input of information and the like from the input unit 212, the controller 215 controls execution of the copying process by the copying unit 214. The controller 215 may cause the display unit 213 to display various types of information related to the copying process. In addition, by operating in cooperation with the printing management server 1, the controller 215 has a function (hereinafter, referred to as "use limit function") which limits the functions used by a user.

Although the functional configuration of the copying machine 21 is described above as an example of the image processing equipment 2, the image processing equipment 2 may have a configuration other than the copying machine 21. For example, the multi-function printer 22 is different from the copying machine 21 in that the multi-function printer 22 includes a multi-function printer function unit instead of the copying unit 214 and a controller which controls the multi-function printer function unit instead of the controller 215 which controls the copying unit 214. Meanwhile, although a controller of each image processing equipment 2 may have a different configuration with respect to control of the functional unit (for example, the copying unit 214 in the copying machine 21) which realizes the appropriate function(s), the controller has the same configuration as another image processing equipment 2 with respect to the use limit function. In addition, the controller of each of the image processing equipment 2 includes the same authentication function as the printing management server 1, so that only an authenticated user can use the image processing equipment 2.

Figure 6:
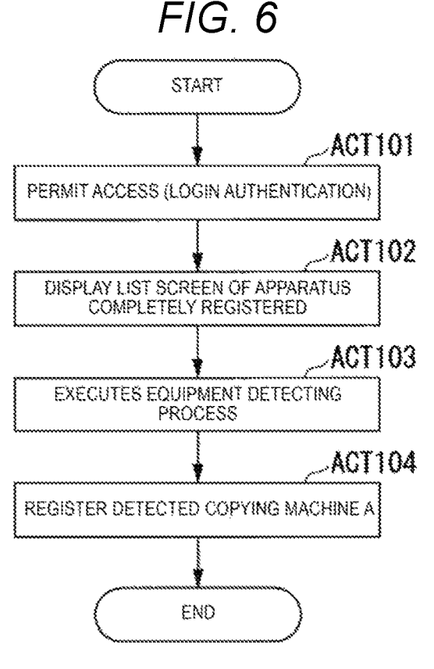
FIG. 6 is a flowchart illustrating an example sequence of operations in which the printing management server registers the image processing equipment.
Figure 7:
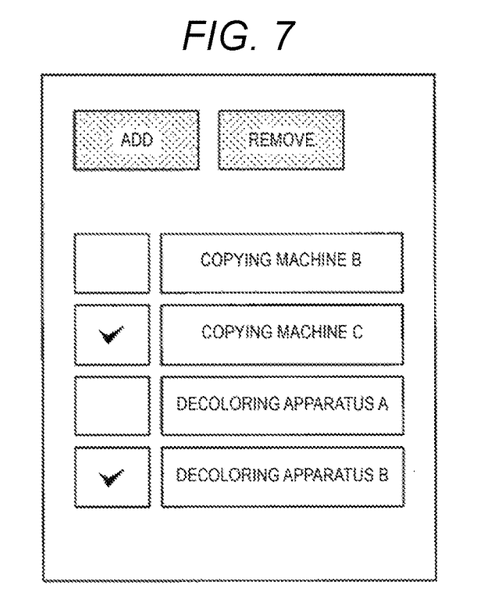
FIG. 7 illustrates an example screen displayed on a user terminal when registering the image processing equipment.
Figure 8:
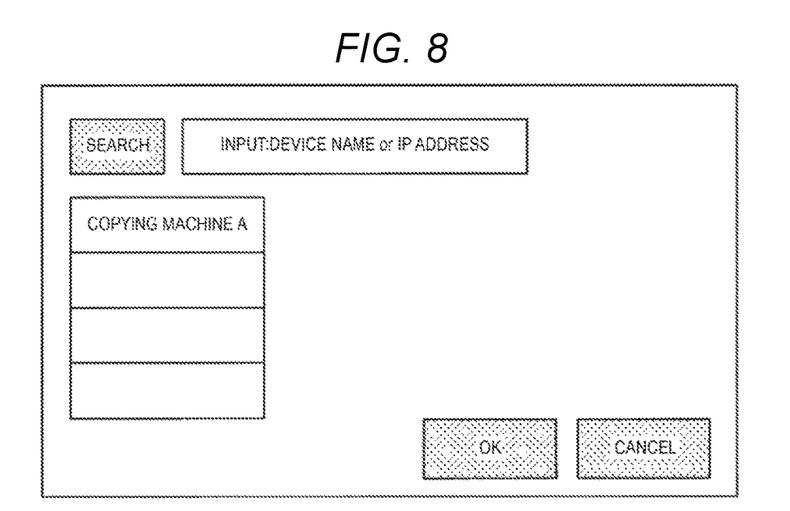
FIG. 8 illustrates another example screen displayed on the user terminal when registering the image processing equipment.

FIG. 6 is a flowchart illustrating an example sequence of operations in which the printing management server 1 registers the image processing equipment 2. In addition, FIGS. 7 and 8 illustrate example screens displayed on the user terminal 3 when registering the image processing equipment 2. Hereinafter, the flowchart illustrated in FIG. 6 will be described with reference to FIGS. 7 and 8. For example, the image processing equipment 2 is registered by a user accessing to an equipment management function of the printing management server 1 via the user terminal 3. For example, access to the equipment management function is permitted only to a user who logs in the printing management server 1. In this case, the user authentication unit 14 of the printing management server 1 requests user authentication information to the user terminal 3 and obtains the user authentication information from the user terminal 3. If the authentication information obtained from the user terminal 3 corresponds to user authentication information stored in the printing management server 1, the user authentication unit 14 permits the user terminal 3 to access the equipment management function of the printing management server 1 (ACT 101).

Therefore, the printing management server 1 causes the user terminal 3 that has been granted access by the equipment information management unit 16 to display a list screen of the image processing equipment 2 already registered (ACT 102). For example, a list screen illustrated in FIG. 7 is displayed on the user terminal 3. By checking the list screen, a user checks whether or not the target image processing equipment 2 (here, it is assumed to be copying machine A) is registered. If the copying machine A is already registered, the user logs out the printing management server 1 and ends operation of equipment registration.

On the other hand, as illustrated in the example in FIG. 7, if the copying machine A is not registered, the user inputs an execution instruction of a process (hereinafter, referred to as "equipment detecting process") in which registrable equipment existing on the network is detected, to the printing management server 1. Specifically, by displaying an equipment detecting screen illustrated in FIG. 8 and pressing a "search" button, the user inputs the execution instruction of the equipment detecting process. According to the input of the execution instruction, the equipment detector 17 of the printing management server 1 executes a detecting process of the registrable equipment (ACT 103). The equipment detector 17 causes the user terminal 3 to display a detection result. The example in FIG. 8 illustrates that the copying machine A is detected by the equipment detecting process.

By checking the detection result, the user inputs an operation registering the detected copying machine A as the image processing equipment 2. For example, by pressing an "OK" button displayed on the equipment detecting screen of FIG. 8, the user instructs the equipment information management unit 16 to register the detected equipment as the image processing equipment 2. According to the input of the registration instruction, the equipment information management unit 16 obtains equipment information from the copying machine A and stores the obtained equipment information in the equipment information storage unit 13 to register the copying machine A in the printing management server 1 as the image processing equipment 2 (ACT 104).

Figure 9:
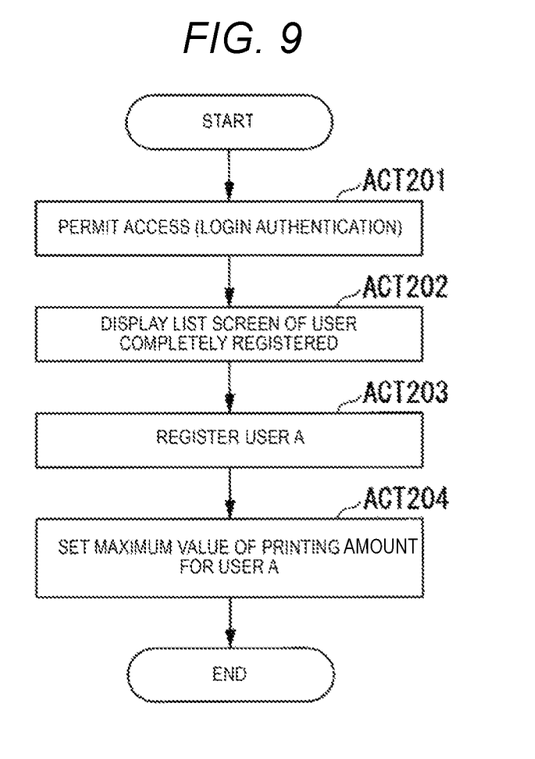
FIG. 9 is a flowchart illustrating an example sequence of operations in which the printing management server registers a user of the printing system.

FIG. 9 is a flowchart illustrating an example sequence of operations in which the printing management server 1 registers a user of the printing system 100. For example, in the same manner as the image processing equipment 2 is registered, a user is registered by accessing a user management function of the printing management server 1 via the user terminal 3. In this case, the user authentication unit 14 of the printing management server 1 authenticates the user in the same method as the image processing equipment 2 is registered and permits the user terminal 3 to access to the user management function of the printing management server 1 (ACT 201).

Therefore, the printing management server 1 causes the user terminal 3 which is authenticated by the user information management unit 15 to display a list screen of the user completely registered (ACT 202). By checking the list screen, the user checks whether or not the target user (here, it is assumed to be user A) is registered. If the user A is already registered, the user logs out the printing management server 1 and ends operation of user registration.

On the other hand, if the user A is not registered, the user inputs an operation to add the user A to printing management server 1. Specifically, the user inputs user information related to the user A illustrated in FIG. 3. According to the input, the user information management unit 15 stores the input user information of the user A in the user information storage unit 12 to register the user A in the printing management server 1 as a user of the printing system 100 (ACT 203).

Further, the user inputs operation to set a maximum value of a printing amount for the registered user A. According to the input, the user information management unit 15 adds the input maximum value of the printing amount to the user information of the user A to set a maximum value of a printing amount for the user A (ACT 204).

Figure 10:
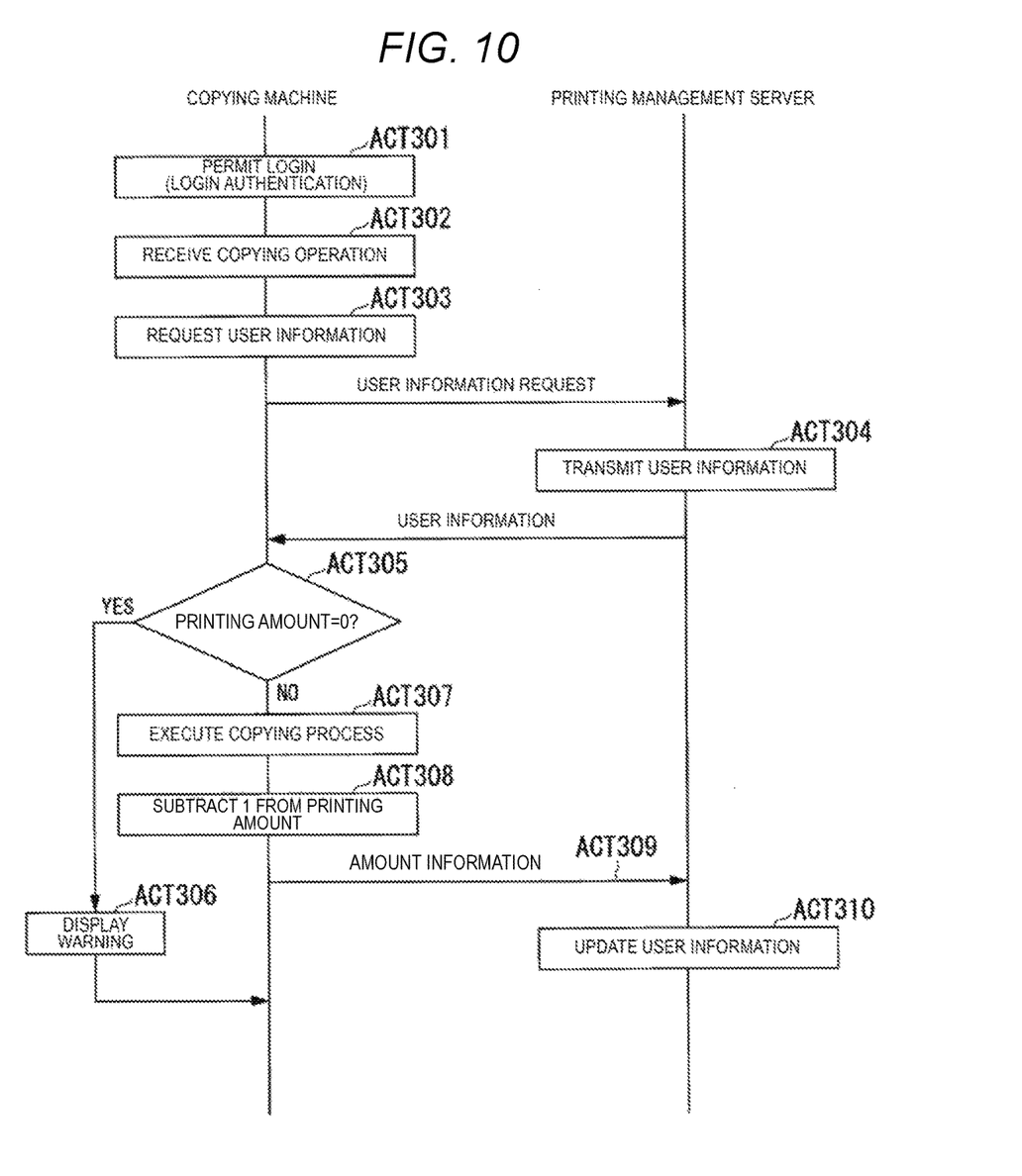
FIG. 10 is a flowchart illustrating an example sequence of operations in which the use of the image processing equipment by a user is limited.

FIG. 10 is a flowchart illustrating an example sequence of operations in which the usage of the image processing equipment 2 by a user is limited in the printing system 100 of the embodiment. Here, a flow of a process executed when the user uses the copying machine 21 will be described as an example. First, a user inputs an operation to log in the copying machine 21. For example, the user operates the input unit 212 to input user's own authentication information (user ID and password). According to the input, the controller 215 determines whether or not the input authentication information corresponds to user authentication information registered in advance, and permits the user to log in if the input authentication information corresponds to the user authentication information registered in advance (ACT 301).

The user may be authenticated in the copying machine 21 by the copying machine 21 storing the same user information as the printing management server 1 or by the copying machine 21 causing the printing management server 1 to execute an authentication process.

The user logged in the copying machine 21 inputs an operation (hereinafter, referred to as "copying operation") for executing a copying process to the copying machine 21. For example, the controller 215 of the copying machine 21 receives an input of the copying operation via the input unit 212 (ACT 302) and obtains user information of the user from the printing management server 1 according to the input of the copying operation. Specifically, the copying machine 21 transmits a user information request to the printing management server 1 (ACT 303) and the printing management server 1 reads the user information of the user from the user information storage unit 12 according to reception of the user information request. The printing management server 1 transmits the read user information to the copying machine 21 (ACT 304).

If the user information is read, the controller 215 determines whether or not a printing amount of the user is zero (ACT 305). If the printing amount is zero (YES in ACT 305), the controller 215 causes the display unit 213 to display a warning display indicating that a printing amount of the user is zero and further copying is not permitted (ACT 306) and ends the process without executing the requested copying process.

On the other hand, if the printing amount is not zero (NO in ACT 305), the controller 215 controls the copying unit 214 to execute the requested copying process (ACT 307). When causing the copying unit 214 to execute the copying process, the controller 215 subtracts 1 from the printing amount of the user (ACT 308). The controller 215 transmits amount information indicating a printing amount after subtraction to the printing management server 1 (ACT 309). Based on the received amount information, the user information management unit 15 updates the user information of the user in the printing management server 1 (ACT 310).

Here, an example in which a printing amount is subtracted by 1 when the user performs the copying operation is described, but the printing amount is subtracted by 1 in the same manner even when the user performs printing operation. In this way, by a printing amount being subtracted according to copying or printing, the amount used of the image processing equipment 2 can be limited for each user.

Figure 11:
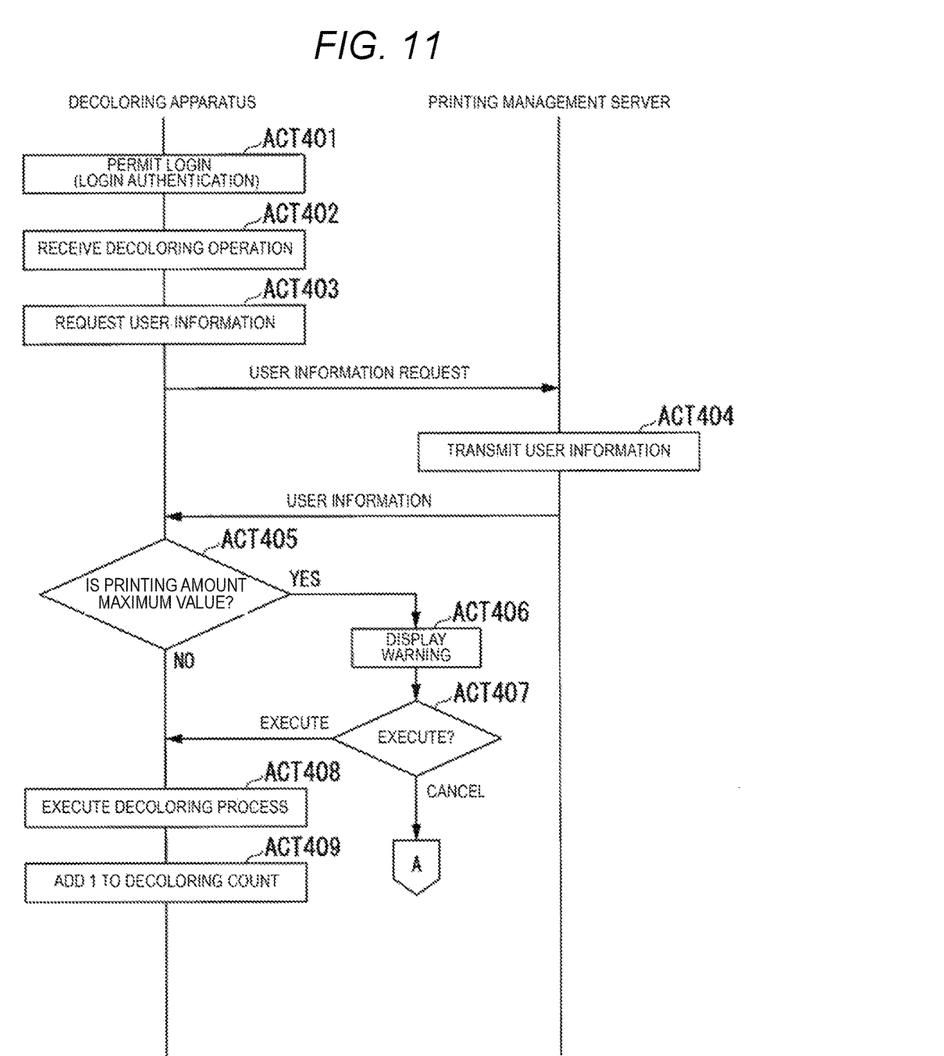
FIGS. 11 and 12 are flowcharts illustrating an example sequence of operations in which value is given to a user who reuses a sheet when using the image processing equipment in the printing system of the embodiment.
Figure 12:
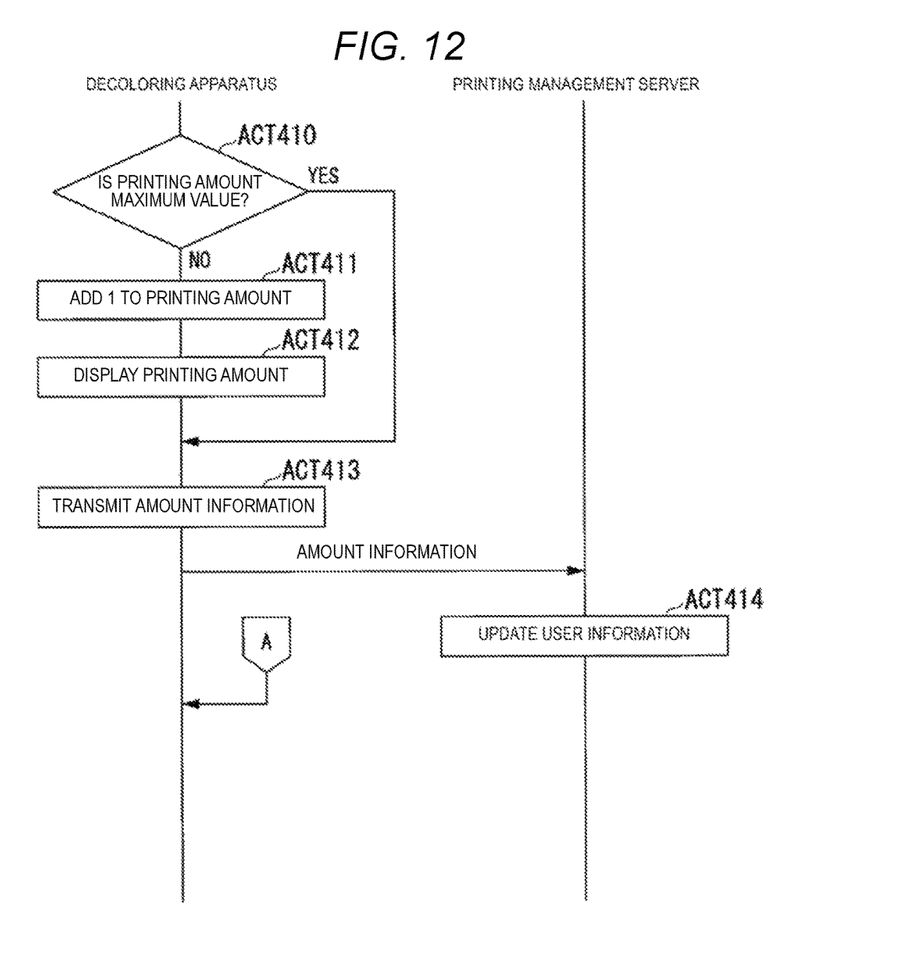

FIGS. 11 and 12 are flowcharts illustrating an example sequence of operations in which value is given to a user who reuses a sheet when using the image processing equipment 2 in the printing system 100 of the embodiment. First, a user inputs an operation to log in the decoloring apparatus 23. According to the input, the decoloring apparatus 23 performs user authentication in the same method as the copying machine 21 and permits the authenticated user to log in the decoloring apparatus 23 (ACT 401).

The user authenticated in the decoloring apparatus 23 inputs an operation (hereinafter, referred to as "decoloring operation") for executing a decoloring process to the decoloring apparatus 23. For example, a controller of the decoloring apparatus 23 receives an input of the decoloring operation via an input unit (ACT 402) and obtains user information of the user from the printing management server 1 according to the input of the decoloring operation. Specifically, the decoloring apparatus 23 transmits a user information request to the printing management server 1 (ACT 403) and the printing management server 1 reads the user information of the user from the user information storage unit 12 according to reception of the user information request. The printing management server 1 transmits the user information to the decoloring apparatus 23 (ACT 404).

If the user information is read, the controller of the decoloring apparatus 23 determines whether or not a printing amount of the user is a maximum value (20 in the example of FIG. 4C) (ACT 405). If the printing amount is the maximum value (YES in ACT 405), the controller causes a display unit to display a warning display indicating that a printing amount of the user is a maximum value and the printing amount is not increased even if the decoloring operation is performed (ACT 406) and causes the display unit to display a display for selecting whether or not to execute the decoloring process.

The controller determines a selection by the user (ACT 407). If the user selects not to execute the decoloring process (CANCEL in Act 407), the controller ends the process without executing the decoloring process. On the other hand, if the user selects to execute the decoloring process (EXECUTE in Act 407), the controller controls a decoloring unit to perform the decoloring process and causes the decoloring unit to execute the requested decoloring process (ACT 408). If the controller causes the decoloring unit to execute the decoloring process, the controller adds 1 to a decoloring count of the user (ACT 409).

Therefore, the controller determines whether or not the printing amount of the user is the maximum value (ACT 410). If the printing amount is not the maximum value (NO in ACT 410), the controller adds 1 to the printing amount (ACT 411) and causes the display unit to display a value of a printing amount after addition (ACT 412). The controller transmits amount information indicating a printing amount or the decoloring count after updating to the printing management server 1 (ACT 413). On the other hand, if the printing amount is the maximum value (YES in ACT 410), the controller moves to a process in ACT 413 without adding 1 to the printing amount. Based on the received amount information, the user information management unit 15 updates the user information of the user in the printing management server 1 (ACT 414).

In this way, in the printing system. 100 of the embodiment configured as described above, a printing amount of a user who reuses a sheet by performing decoloring operation is managed so as to be increased by the number of times of reuse. According to the configuration described above, the printing system 100 of the embodiment can provide value to the user who reuses a sheet when using an image forming apparatus.

In addition, in the printing system 100 of the embodiment, a printing amount of each user is managed so as not to exceed a predetermined maximum value. According to the management of the printing amount described above, the printing system 100 of the embodiment can provide value to the user who reuses a sheet within a predetermined range.

Hereinafter, a modification example of the printing system 100 of the embodiment will be described.

In the embodiment described above, addition or subtraction of the printing amount is executed by the controller of the image processing equipment 2, but various calculations related to the printing amount may be performed by the printing management server 1. In addition, in the embodiment described above, a determination of a printing amount and various display processes according to a determination result of the determination process are executed or controlled by the controller of the image processing equipment 2, however, each of these processes may be executed or controlled by the printing management server 1. In this case, for example, the user information management unit 15 of the printing management server 1 may subtract 1 from a printing amount according to execution of a copying process by the copying machine 21 or execution of a printing process by the multi-function printer 22 and may add 1 to the printing amount according to execution of a decoloring process of the decoloring apparatus 23. In addition, for example, the user information management unit 15 of the printing management server 1 may instruct the image processing equipment 2 to execute a printing process, a copying process, a decoloring process, or various display processes according to a value of a printing amount before updating or after updating.

In the embodiment described above, a printing amount is managed within a range not exceeding a preset maximum value, but if additional value is needed to be given to a user who reuses a sheet, the printing amount after addition may be permitted to exceed a maximum value. In addition, if the printing amount exceeds the maximum value, a printing amount in excess of the maximum value may be added to another amount. For example, if an amount (hereinafter, referred to as "scan amount") for limiting the number of uses of a reading function of the multi-function printer 22 is provided, a printing amount in excess of the maximum value may be added to the scan amount. In addition, if a printing amount is provided for each of printing types such as color printing or monochrome printing, for example, an amount for an excess of the printing amount of the color printing may be added to the printing amount of another printing type such as monochrome printing.

In the embodiment described above, the printing system 100 which manages the amount used for each user is described, but the amount used may be managed differently. For example, the amount used may be managed in units of departments instead of each user. In this case, a printing amount is provided for each department and may be managed according to a use state of a user belonging to the department.

Based on an input from an external unit, the user information management unit 15 of the printing management server 1 may include a function of updating user information for each user. In this case, a system administrator can log in the printing management server 1 and can directly edit a printing amount of the user or a maximum value of the printing amount. In addition, the maximum value of the printing amount may be set as a value common to all users and may be set as different values for each user.

According to at least one embodiment described above, based on the amount used of the decoloring apparatus 23 by a user, by having a management unit for increasing an amount value indicating the usable amount of an image forming apparatus of the user (for example, the copying machine 21 and the multi-function printer 22), it is possible to give value to a user who reuses a sheet when using the image forming apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a user interface that receives user information and image formation execution information;
an image forming unit that forms an image on a sheet;
a communication interface; and
a processor configured to:
   authenticate a user based on the received user information,
   control the communication interface to receive, from a server, a printing amount that indicates a number of times of printing in the image processing apparatus in association with the received user information and that is updated based on a number of sheets decolored by a decoloring apparatus,
   determine whether the received printing amount is greater than zero,
   if the received printing amount is greater than zero, control the image forming unit to form an image on the sheet in accordance with the input image formation execution information, and
   if the received printing amount is not greater than zero, control the image forming unit to not form an image on the sheet in accordance with the received image formation execution information.

2. The apparatus according to claim 1, further comprising:
a display device, wherein, if the received printing amount is not greater than zero, the processor controls the display device to display a warning that printing is not permitted.

3. The apparatus according to claim 1, wherein the processor is further configured to:
subtract, from the printing amount, a total number of sheets printed in accordance with the received image formation execution information, and
transmit, to the server via the communication interface, the printing amount after the subtraction.

4. The apparatus according to claim 1, wherein the processor authenticates the user by determining whether the received user information corresponds to a previously stored user information record.

5. The apparatus according to claim 1, wherein the processor authenticates the user by transmitting, to the server via the communication interface, the received user information, and receiving, from the server via the communication interface, authentication information.

* * * * *